(12) United States Patent
Sasaki et al.

(10) Patent No.: US 9,219,439 B2
(45) Date of Patent: Dec. 22, 2015

(54) ELECTRIC MOTOR CONTROL DEVICE

(71) Applicant: Panasonic Corporation, Osaka (JP)

(72) Inventors: Ryuta Sasaki, Osaka (JP); Kenichi Kishimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 53 days.

(21) Appl. No.: 14/358,173

(22) PCT Filed: Dec. 3, 2012

(86) PCT No.: PCT/JP2012/007730
§ 371 (c)(1),
(2) Date: May 14, 2014

(87) PCT Pub. No.: WO2013/084461
PCT Pub. Date: Jun. 13, 2013

(65) Prior Publication Data
US 2014/0312812 A1    Oct. 23, 2014

(30) Foreign Application Priority Data

Dec. 9, 2011  (JP) .................................. 2011-269678

(51) Int. Cl.
*H02P 21/00* (2006.01)
*H02P 21/04* (2006.01)
*H02P 21/06* (2006.01)

(52) U.S. Cl.
CPC ........ *H02P 21/0035* (2013.01); *H02P 21/0003* (2013.01); *H02P 21/0039* (2013.01); *H02P 21/0089* (2013.01); *H02P 21/06* (2013.01); *H02P 2207/05* (2013.01)

(58) Field of Classification Search
CPC . H02P 21/0039; H02P 21/06; H02P 2207/05; H02P 21/0042; H02P 21/14; H02P 21/146; H02P 2203/09; H02P 25/08; H02P 27/06; H02P 6/08; H02P 6/18; H02P 9/009; H02P 9/30; H02P 21/0003; H02P 21/0035; H02P 21/0089; H02K 1/145; H02K 1/246; H02K 3/28
USPC ............. 318/400.02, 400.12, 400.15, 400.36, 318/599, 701, 721, 801; 363/40, 41, 42; 388/811, 819
See application file for complete search history.

(56) References Cited

U.S. PATENT DOCUMENTS

| | | | | |
|---|---|---|---|---|
| 6,121,736 A | * | 9/2000 | Narazaki ................ | H02P 6/085 318/400.02 |
| 6,396,229 B1 | * | 5/2002 | Sakamoto ................ | H02P 6/18 318/400.02 |
| 6,954,050 B2 | * | 10/2005 | Tobari ....................... | H02P 6/18 318/453 |
| 7,190,130 B2 | * | 3/2007 | Wogari ................... | H02P 6/185 318/400.02 |
| 8,525,454 B2 | * | 9/2013 | Kimpara ............... | H02P 29/022 318/400.02 |
| 8,541,971 B2 | * | 9/2013 | Sakai ..................... | H02P 9/009 318/400.02 |
| 2002/0060548 A1 | * | 5/2002 | Iwaji ........................ | H02P 6/18 318/727 |
| 2004/0195993 A1 | * | 10/2004 | Yoshimoto .............. | H02P 21/06 318/802 |
| 2007/0216342 A1 | | 9/2007 | Tobari et al. | |

FOREIGN PATENT DOCUMENTS

| | | |
|---|---|---|
| JP | 11-27996 A | 1/1999 |
| JP | 2003-209996 A | 7/2003 |
| JP | 2007-252052 A | 9/2007 |
| JP | 2010-119245 A | 5/2010 |

OTHER PUBLICATIONS

Jang-Mok Kim, Speed Control of Interior Permanent Magnet Synchronous Motor Drive for the Flux Weakening Operation, IEEE Xplore, IEEE Transactions on Industry Applications, vol. 33, No. 1, p. 43-48, Jan./Feb. 1997.
International Search Report for PCT/JP2012/007730, Feb. 19, 2013.

* cited by examiner

Primary Examiner — Rita Leykin
(74) Attorney, Agent, or Firm — RatnerPrestia

(57) ABSTRACT

An electric motor control device includes a current vector controller that follows a target command value for controlling an electric current of the motor by separating the current into a d-axis current and q-axis current orthogonal to each other. The motor control device further includes a driver for driving the motor, a phase-angle generator a phase-angle command generator for generating a phase-angle command β* based on difference Δv* between an absolute value |v*| of a voltage command supplied from the current vector controller to the driver and a given reference value $V_{lmt}$, a d-axis current command generator for generating d-axis current command id* based on a sine value of the phase-angle command β*, and a q-axis current limiter for setting a limit value of q-axis current command iq* based on a cosine value of the phase-angle command β*. This structure allows canceling a voltage saturation, and driving the motor stably with high output around a voltage saturation region even if a target command value exceeding an output limit of the motor is input.

10 Claims, 11 Drawing Sheets

ELECTRIC MOTOR CONTROL DEVICE

This application is a U.S. National Phase Application of PCT International Application PCT/JP2012/007730.

TECHNICAL FIELD

The present invention relates to an electric motor control device employing a current vector control method, and more particularly, it relates to a technique that allows a flux weakening control or a command limit for powering or regenerating the motor around a voltage saturated region.

BACKGROUND ART

In general a vector control method is used for controlling an electric current of a motor employing a permanent magnet synchronous method. The vector control method separates the current into q-axis current that increases torque, and its orthogonal d-axis current. This vector control is carried out by a vector controller that receives an external command for calculating a command voltage to be supplied to a motor driver that supplies the power to the motor.

The vector control method discussed above sometimes encounters such a phenomenon that when a value of the external command becomes greater, the command voltage exceeds a suppliable voltage from the motor driver. This phenomenon is referred to as a voltage saturation, which tends to occur easier at a greater rpm of the motor. Because an induction voltage generated during the rotating of the motor increases in proportion to the rpm, and this increment can be supplemented with the voltage supplied from the motor, so that a voltage between the terminals of the motor also increases. The suppliable voltage also becomes smaller in a case where large load is applied or a low power voltage is applied. In this case, the voltage saturation tends to occur because a margin of the suppliable voltage becomes smaller.

The voltage saturation fails to increase the q-axis current during the powering operation of the motor, so that torque may decrease, or an integration term of the current controller is wound-up. As a result, static or dynamic characteristics can be lowered. During the regenerating operation, the q-axis current greater than the command value flows, which invites an over-current, over-voltage or excessive brake-torque, whereby the safety is adversely affected.

To overcome this problem, a flux weakening control method is employed for preventing the voltage saturation. This method allows delivering a negative d-axis current for demagnetizing the magnetic flux produced by the permanent magnet, thereby preventing the induction voltage from increasing.

Here is an example of a conventional flux weakening control method. This method uses a means for detecting a voltage saturation, and integrates a signal corresponding to a saturation amount detected by this means or integrates an appropriate fixed value. The integrated value is output as a d-axis current command to the current controller. This method is referred to as a closed-loop flux weakening control method. (Refer to Patent Literature 1.)

However, when the negative d-axis current is kept increasing, a voltage-reduction effect is lowered before the voltage turns to increase. The boundary, at which the voltage turns from decrease to increase, is a limit of the flux weakening control, and a margin of the voltage between the terminals of the motor becomes maximum at this limit. In other words, an available q-axis current and an available torque become maximum at this limit. Hereinafter, the maximum suppliable torque of the motor is referred to as a limit torque.

The limit torque does not stay constant but it varies depending on the condition of the motor. Since the margin of the voltage between terminals of the motor becomes smaller at a greater induction voltage, the limit torque decreases at a greater rpm. The torque suppliable at a low rpm thus occasionally cannot be supplied at a greater rpm even with the aid of the flux weakening control.

Greater torque than the limit torque will cause the voltage saturation, which incurs a torque-tracking error or wind-up, and resultantly invites unstable control as well as degradation in characteristics. Worse still, when the closed-loop flux weakening control is done in the voltage saturation state, the d-axis current command disperses along a negative direction, so that unsteady control is expected.

Patent Literature 2 discloses prior art for overcoming the foregoing output-limit problem. FIG. 11 shows a block diagram of a motor control device employing this prior art. In motor control device 90 shown in FIG. 11, current-vector controller 102 follows an external torque command $\tau_0^*$ for controlling an electric current of motor 100. Saturation detector 112 detects a voltage saturation based on voltage commands vd* and vq* supplied from current-vector controller 102 to driver 101. Saturation integrator 113 performs integral computation based on a saturation detection signal supplied from saturation detector 112, and generates a flux weakening current command $ids_0^*$, (i.e. a negative d-axis current command). Maximum d-axis current calculator 114 sets a negative upper limit value $ids_{lmt}$ of the flux weakening current command based on suppliable voltage Vc from driver 101 and rpm ω of motor 100. A d-axis current limiter 115 limits the flux weakening current command $ids_0^*$ to the upper limit value $ids_{lmt}$. Target command limit value calculator 116 sets a limit torque value $\tau_{lmt}^*$ based on suppliable voltage Vc, rpm ω, and upper limit value $ids_{lmt}$. Target command limiter 117 limits external command torque $\tau 0^*$ to limit torque value $\tau_{lmt}^*$. Regular region d-axis current calculator 118 outputs regular current command idu* based on command torque $\tau^*$ supplied from target command limiter 117. A d-axis current selector 119 selects one of regular current command idu* or flux weakening current command ids* supplied from d-axis current limiter 115 for outputting the selected one as a d-axis current command id* to current-vector controller 102. A q-axis current command generator 108 generates a q-axis current command iq* based on command torque $\tau^*$ and d-axis current command id*, and supplies it to current-vector controller 102.

The prior art discussed above allows preventing the voltage saturation with the aid of the flux weakening control, and allows limiting the external command torque τ0 to the limit torque value $\tau_{lmt}^*$ suppliable from the motor. As a result, the voltage saturation cannot occur in the entire operating range. The foregoing prior art also allows limiting the flux weakening current command $ids_0^*$ to the upper limit $ids_{lmt}$ that works for obtaining the limit torque value $\tau_{lmt}^*$. As a result, the d-axis current command can be prevented from dispersing.

However, the prior art disclosed in Patent Literature 2 calculates the limit torque value $\tau_{lmt}^*$ suppliable from the motor based on suppliable voltage Vc from the driver, rpm ω of the motor, and the negative upper limit $ids_{lmt}$ of the flux weakening current command and using a formula including constants (e.g. inductance) proper to the motor (motor constant). Variations in inductance of the motor depending on the motor operation or dispersions in motor constant of each motor will fail to calculate the limit torque value $\tau_{lmt}^*$ correctly.

If an error generated in this calculation causes setting the limit torque value $\tau_{lmt}^*$ (i.e. torque limiting value) greater than an actual limit torque, the electric current is controlled based on torque command $\tau^*$ greater than the limit torque, so that the voltage saturation occasionally cannot be overcome.

To the contrary, when the limit torque value $\tau_{lmt}^*$ (i.e. torque limiting value) is set smaller than the actual limit torque, torque command $\tau^*$ is excessively limited, so that sufficient torque occasionally cannot be produced.

RELATED ART LITERATURE

Patent Literature 1: Unexamined Japanese Patent Application Publication No. H11-27996
Patent Literature 2: Unexamined Japanese Patent Application Publication No. 2003-209996

SUMMARY OF INVENTION

The motor control device of the present invention includes a current-vector controller that follows a target command value and separates an electric current of the motor into a d-axis current and a q-axis current orthogonal to each other for controlling the electric current. This control device further includes the following structural elements:
a driver for driving the motor;
a phase-angle command generator for generating a phase angle based on a difference between an absolute value of a voltage command supplied from current-vector controller to the driver and a given reference value;
a d-axis current command generator for generating a d-axis current command based on a sine value of the phase-angle command; and
a q-axis current limiter for setting a limit value to a q-axis current command based on a cosine value of the phase-angle command.

The foregoing structure allows setting a limit value of the q-axis current command in response to a magnitude of a voltage saturation, so that when a target command value that exceeds an output limit of the motor is input, the command on q-axis current can be automatically and accurately controlled for canceling the voltage saturation even if the motor constant varies or disperses.

The control device of the present invention thus can maintain automatically and accurately the q-axis current command at a suppliable output limit even when the motor constant varies or disperses, so that the control device allows driving the motor stably with high-output. During a regenerating operation, the q-axis current command can be similarly limited appropriately, so that an over-current or an over-voltage caused by an excessive q-axis current can be prevented, and excessive brake torque can be also avoided. As a result, stable and efficient regenerating operation can be expected up to a limitation of the motor.

PREFERRED EMBODIMENTS

Exemplary embodiments of the present invention are demonstrated hereinafter with reference to the accompanying drawings. In these embodiments, a motor control device that controls and drives a motor employing a permanent-magnet synchronous method is taken as an example. The present invention is not limited to these embodiments.

Exemplary Embodiment 1

Figure 1:
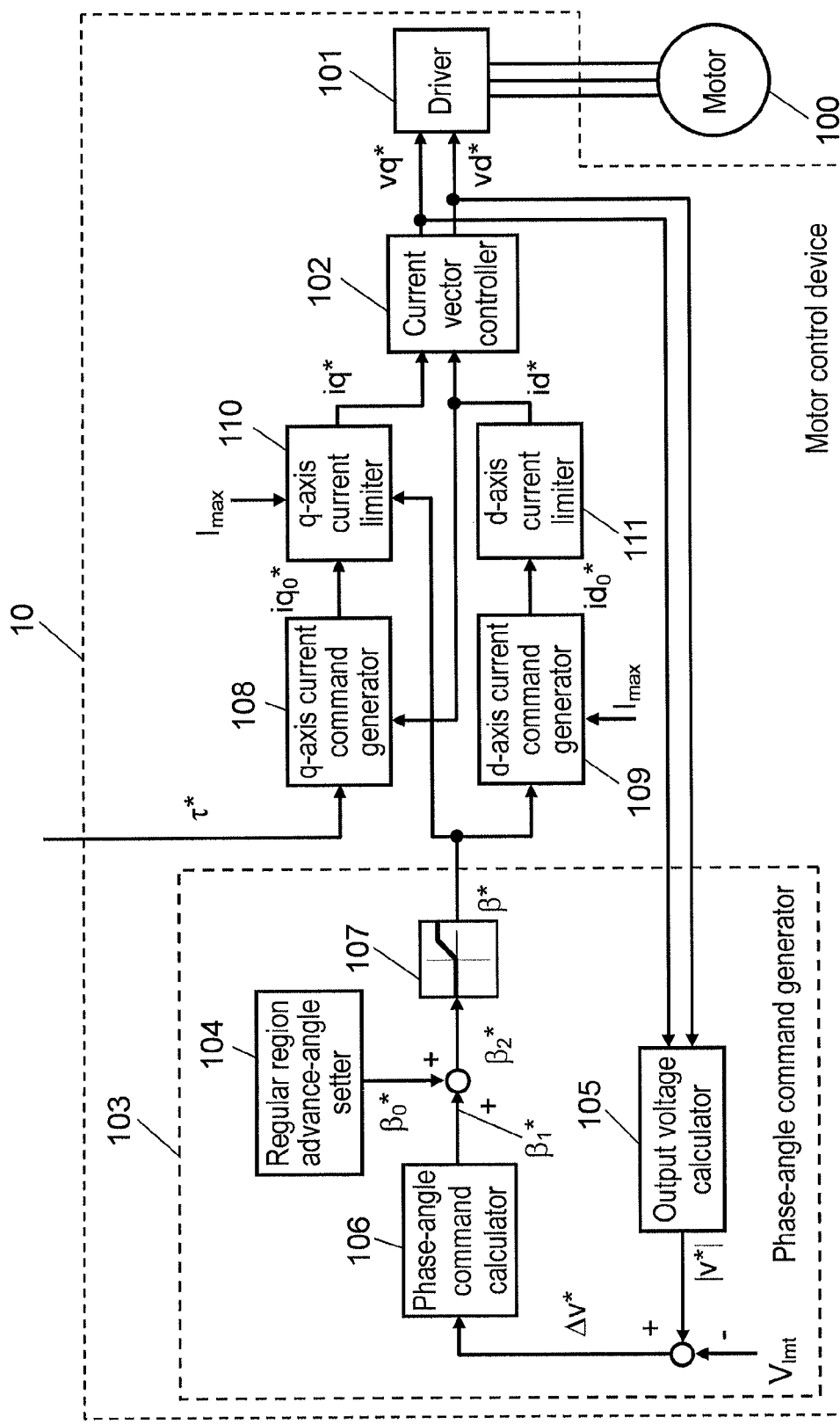
FIG. 1 is a block diagram of an electric motor control device in accordance with a first embodiment of the present invention.

FIG. 1 is a block diagram of motor control device 10 in accordance with the first embodiment of the present invention. Motor control device 10 is formed of a drive-control system configured to follow torque command $\tau^*$ supplied from the outside for driving motor 100 employing a permanent-magnet synchronous method.

In FIG. 1, motor 100 includes permanent magnets (not shown) and windings (not shown) wound on an iron core. Motor control device 10 supplies an electric current to these windings, thereby rotating a rotor. FIG. 1 shows a structure in which motor 100 is driven by three-phase AC power, namely, the three phases include phases U, V, and W.

The structure and operation of motor control device 10 shown in FIG. 1 are described hereinafter. Driver 101 energizes the windings for rotating the rotor. First, driver 101 carries out a two-to-three phase conversion that converts voltage commands Vd* and Vq*, respectively supplied to d-axis (i.e. field direction of motor 100) and q-axis orthogonal to each other, into three-phase voltage command to be given to phases U, V, and W of motor 100. On top of that, driver 101 follows the three-phase voltage command and carries out power conversion for generating a voltage actually at each phase of motor 100.

Current-vector, controller 102 generates a d-axis voltage command vd* in order for an error between d-axis current command id* and a d-axis current value to be 0 (zero), and also generates a q-axis voltage command vq* in order for an error between q-axis current command iq* and a q-axis current value to be 0 (zero). The d-axis current value and q-axis current value are the current values of the axes energizing motor 100, and these values are found by measurement or estimation. These voltage commands can be generated by, for instance, PI (proportional integration) control. As discussed above, current-vector controller 102 follows the target command value for separating the electric current of motor 100 into the d-axis current orthogonal to each other and the q-axis current, thereby controlling motor 100.

Phase-angle command generator 103 generates a phase-angle command β* to be supplied to d-axis current command generator 109 and q-axis current limiter 110.

An interior structure of phase-angle command generator 103 is demonstrated hereinafter. Regular region advance-angle setter 104 generates a phase-angle command (hereinafter referred to as regular region advance-angle) $\beta_0$* for an operation region where no voltage saturation occurs. The generative grammar is not limited to a specific one, for instance, it can be an operation based on a ratio of max. torque/current, or based on max. efficiency. In the region where no voltage saturation occurs, this generated command is used for adjusting a current phase in order to minimize copper loss or iron loss of motor 100 based on a known advance-angle control method. Here is another way, namely, $\beta_0$*=0 is output, thereby maintaining the d-axis current always at 0 (zero) in that region.

Output voltage calculator 105 receives voltage commands vd* and vq* from current-vector controller 102, and calculates an absolute value of the voltage command, namely |v*|, based on equation (1).

$$|v^*|=\sqrt{vd^{*2}+vq^{*2}} \qquad (1)$$

Phase-angle command calculator 106 generates phase-angle command $\beta_1$* based on voltage difference Δv* found by subtracting a given reference value $V_{lmt}$ from the absolute value |v*| of the voltage command. A generative grammar for this generation is not limited to a specific one, for instance, it can be generated by integrating voltage difference Δv*, or by adding an integrating calculation value of voltage difference Δv* to a proportional calculated value.

Setting the given reference value $V_{lmt}$ at the same value as a maximum suppliable voltage from driver 101 will allow inputting a positive voltage difference Δv* to phase-angle command calculator 106, thereby increasing phase-angle command $\beta_1$*. When the voltage saturation does not occur, negative voltage difference Δv* is input to phase-angle command calculator 106, thereby decreasing phase-angle command $\beta_1$*. In this case, the given reference value $V_{lmt}$ can be set smaller than the max. suppliable voltage from driver 101. Since negative phase-angle command $\beta_1$* is not needed, a lower limit of the integrating calculation value is limited to 0 (zero).

Phase-angle limiter 107 limits the value of $\beta_2$* between 0 and 90 degrees. This value $\beta_2$* is found by adding regular region advance-angle $\beta_0$* generated by regular region advance-angle setter 104 to phase-angle command $\beta_1$* generated by phase-angle command calculator 106. The limited value $\beta_2$* is output as a phase-angle command. To be more specific, phase limiter 107 outputs the value $\beta_2$* when this value falls within a range from 0 to 90 degrees, and when this value exceeds 90 degrees, limiter 107 outputs 90 degrees, and when this value is smaller than 0 degree, limiter 107 outputs 0 degree as phase-angle command $\beta_3$* The interior structure of phase-angle command generator 103 is described hereinbefore.

The q-axis current command generator 108 generates q-axis current command $iq_0$* that allows the torque of motor 100 to follow torque command τ* notified from the outside as a target command value. The generating means employs, for instance, equation (2) expressing a relation between output torque and the current of the motor. A torque calculating equation such as equation (2) is derived from a known method, disclosed in Patent Literature 2, for calculating torque.

$$\tau=P\cdot\{\psi_0\cdot iq(Ld-Lq)\cdot id\cdot iq\} \qquad (2)$$

where Ld=an inductance of d-axis, Lq=an inductance of q-axis, P=the number of pole pairs, $\psi_0$=flux linkage produced by the permanent magnets, τ=torque, id=current of d-axis, and iq=current of q-axis.

In this first embodiment, q-axis current command generator 108 includes equation (2) or a data-table based on equation (2) therein, and q-axis current command $iq_0$* is to be generated based on torque command T and d-axis current command id*.

The d-axis current command generator 109 substitutes phase-angle command β* into equation (3) or the data-table derived from equation (3), and generates d-axis current command $id_0$* found by multiplying sine value sin (β*) of phase-angle command β* by max. current value $I_{max}$ and change a sign of the product to an opposite one. In this context, the max current value $I_{max}$ refers to an upper limit of a size of current vector |I| found by adding d-axis current vector id* to q-axis current vector iq*. The size of vector |I| is calculated by equation (4). The reason why the multiplication of max. current value $I_{max}$ is needed is described later.

$$id_0^*=I_{max}\cdot\sin\beta^* \qquad (3)$$

$$|I|=\sqrt{id^{*2}+iq^{*2}} \qquad (4)$$

The d-axis current command $id_0$* increases (decreases) in negative direction as the phase-angle command β increases (decreases), so that the flux weakening control can be done automatically and accurately in response to a magnitude of the voltage saturation.

A q-axis current limiter 110 substitutes phase-angle command β* into equation (5) or a data-table derived from equation (5), and calculates q-axis current limit value $iq_{lmt}$ found by multiplying cosine value cos(β*) of phase-angle command β* by max. current value $I_{max}$, and then sets the q-axis current limit value $iq_{lmt}$ the max. absolute value of the q-axis current command, namely, the q-axis current command iq* is limited between upper limit $iq_{lmt}$ and lower limit $-iq_{lmt}$. To be more specific, when the q-axis current command $iq_0$* supplied falls within the range from upper limit $iq_{lmt}$ and lower limit $-iq_{lmt}$, the supplied value is output as it is, and when the supplied command exceeds the upper limit $iq_{lmt}$, the upper limit $iq_{lmt}$ is output, and when the supplied command is smaller than lower limit $-iq_{lmt}$, the lower limit $-iq_{lmt}$ is output. The limitation of the absolute value allows limiter 110 to work as a limiter in both the cases when the external torque command τ* takes either a negative value or a positive value. The reason why the multiplication of max. current value $I_{max}$ is needed is described later.

$$iq_{lmt}=I_{max}\cdot\cos\beta^* \qquad (5)$$

Since the q-axis current limit value $iq_{lmt}$ decreases (increases) in response to an increment (decrement) of the phase-angle command β*, the q-axis current command iq* is adjusted depending on the magnitude of the voltage saturation. This mechanism allows maintaining the q-axis current command at an output limit automatically and accurately even if torque command τ* exceeding the suppliable limit torque from motor 100 is supplied even if the motor constant contains some variation or dispersion.

In equations (3) and (5), the maximum current value $I_{max}$ is multiplied, so that the size of current command obtained by combining the d-axis current command id* and the q-axis current command iq* is limited automatically not to exceed the maximum current value $I_{max}$. This mechanism allows preventing heat generation and lower efficiency caused by an excessive increase in the current of motor 100.

As discussed above, both of d-axis current command generator 109 and q-axis current limiter 110 take two jobs on themselves simultaneously, namely, one job is to cancel the voltage saturation (the flux weakening control, q-axis current command limitation), and the other job is to limit a size of current obtained by combining the d-axis current and the q-axis current. This mechanism allows achieving a simple structure, where no independent limiter is needed, for limiting the current of motor 100.

D-axis limiter 111 limits d-axis current command $id_0$* to a given limited value smaller than max. current value $I_{max}$. This given limited value can be a fixed value or a value determined in response to the rpm or the source voltage of motor 100. This structure allows limiting a size of the d-axis current around the output limit region, and preventing the copper loss from increasing.

Figure 2:
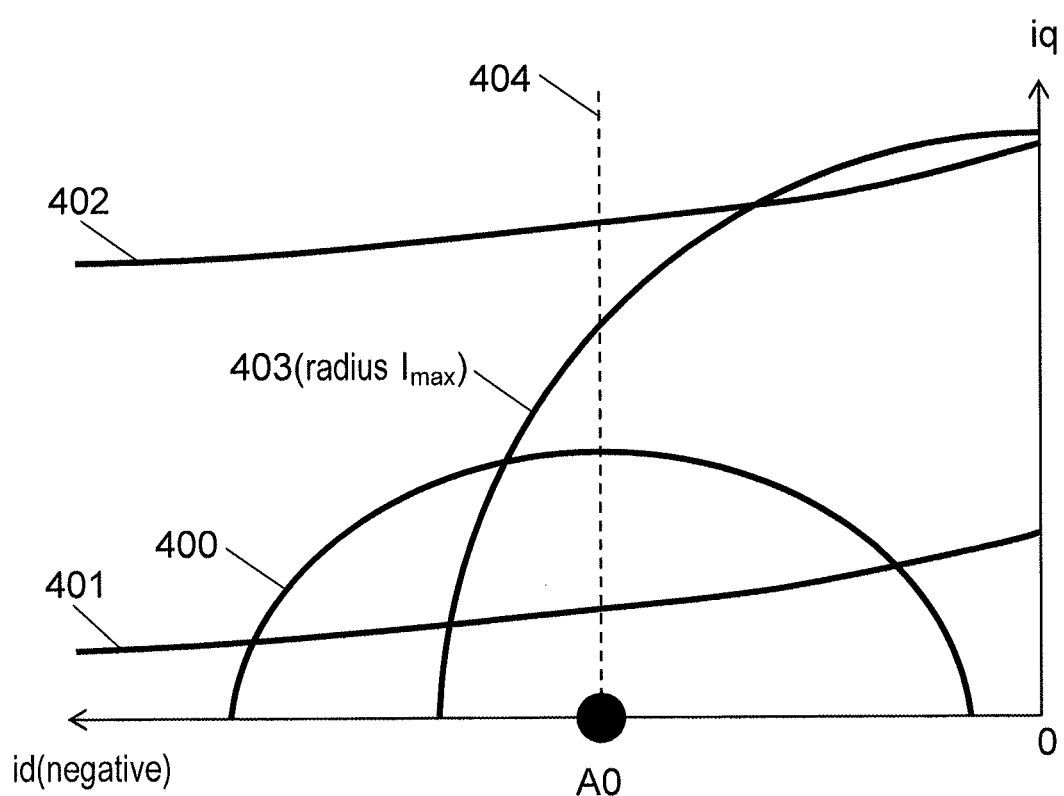
FIG. 2 shows a locus of current-vector when the motor control device powers the motor.

The operation and action of the foregoing electric motor control device 10 are detailed hereinafter. FIG. 2 shows a locus of an electric current when control device 10 powers motor 100. FIG. 3-FIG. 7 illustrate changes in the locus of the current vector when control device 10 powers motor 100. FIG. 2-FIG. 7 are used for supplemental explanations hereinafter.

The current-vector locus is drawn this way: On the rectangular coordinate formed by d-axis and q-axis, d-axis represents d-axis current value id, and q-axis represents q-axis current value iq. A current obtained by combining d-axis current and q-axis current is expressed as a current vector starting from the origin of the coordinate, and its locus is plotted.

Voltage limiting oval 400 refers to a range from which the current vector limited by the suppliable voltage from driver 101 is selected. The outside of oval 400 refers to a voltage saturation range. When the rpm of motor 100 increases or its source voltage is lowered, voltage limiting oval 400 shrinks with an origin of center point AO maintained. The origin of center point AO is expressed as:

$$(id, iq) = (-\psi_0/Ld, 0)$$

Constant torque curves 401, 402, and 405 represent current-vector loci for outputting constant torque, and are derived from equation (2). Curves 401 and 402 represent positive torque, and curve 405 represents negative torque.

Current limiting circle 403 is drawn this way: the origin of the coordinate is a center point of circle 403, and a radius of circle 403 is max. current value $I_{max}$. D-axis current limiting line 404 shows a given limit value to which d-axis current limiter 111 limits the d-axis current command.

The action of this first embodiment is demonstrated hereinafter using constant-torque curves 401, 402, and 405 in this order. These curves represent torque command value τ*.

First, a case where external torque command value τ* is represented by curve 401 shown in FIG. 2 is demonstrated. In this case, the current command vector becomes point A1 shown in FIG. 3 when no negative d-axis current flows. Since point A1 is located outside oval 400, motor 100 is in the voltage saturation state. As a result, phase-angle command β* is generated, negative d-axis current vector id* increases, and the flux weakening control is carried out. A point, corresponding to d-axis current vector id*, on curve 401 becomes a current command vector.

Figure 3:
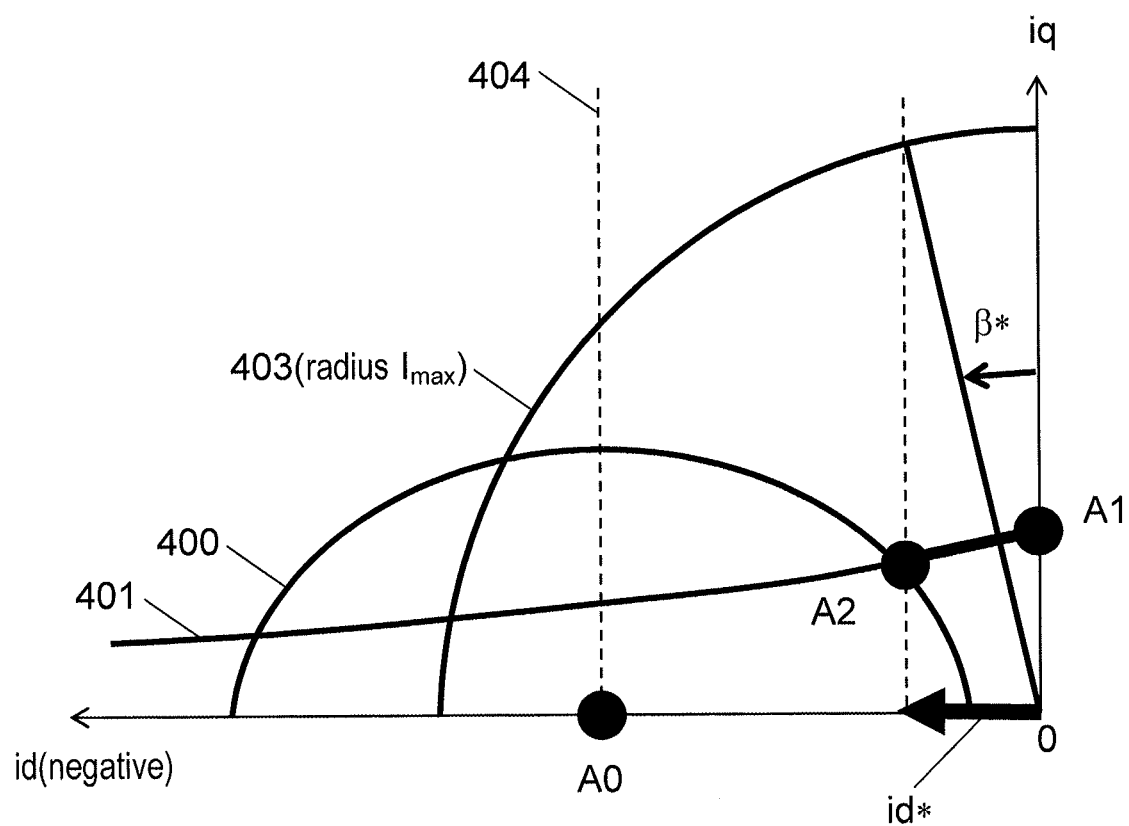
FIG. 3 illustrates a change in the locus of current-vector during the powering operation of the motor control device.

As shown in FIG. 3, when the current command vector arrives at intersection point A2 of constant-torque curve 401 and voltage limiting oval 400, the voltage saturation is cancelled.

Figure 4:
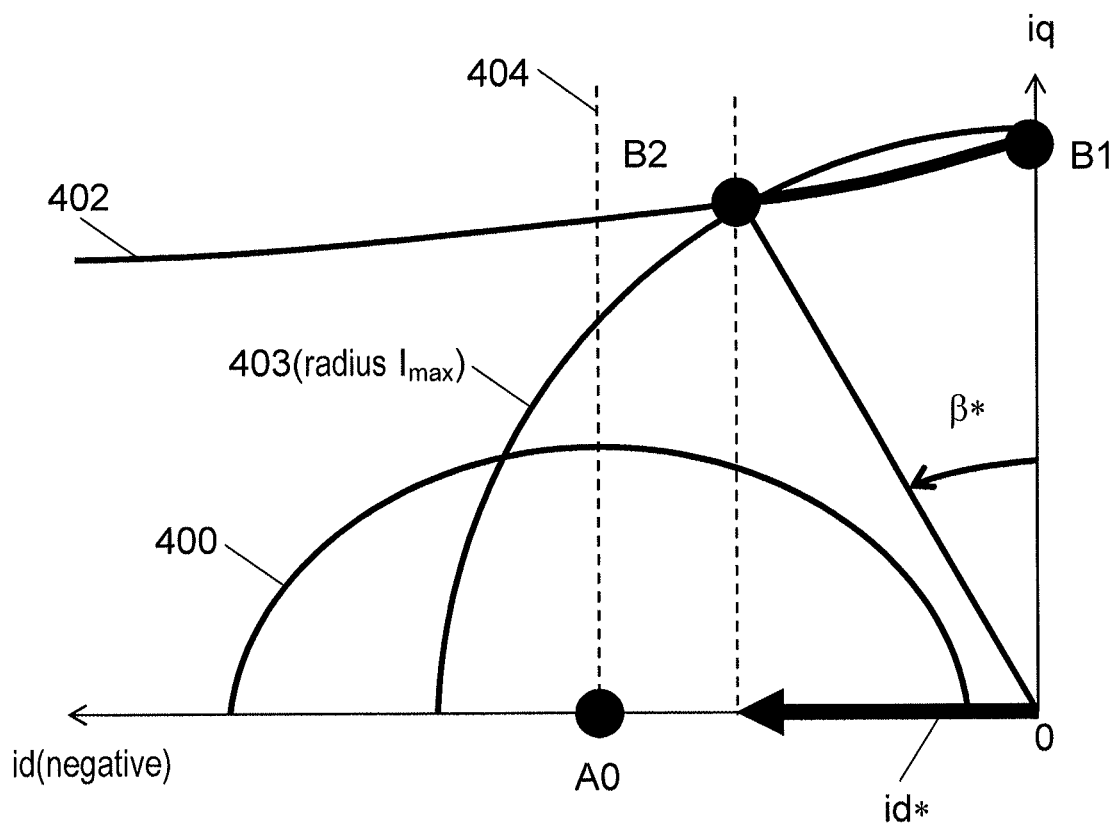
FIG. 4 illustrates a change in the locus of current-vector during the powering operation of the motor control device.

Next, a case where external torque value τ* is represented by curve 402 shown in FIG. 4 is demonstrated. In this case, the current command vector becomes point B1 shown in FIG. 4 when no negative d-axis current flows. Since point B1 is located outside oval 400, motor 100 is in the voltage saturation state, and the flux weakening control is carried out as in the first case.

As shown in FIG. 4, the current command vector moves along curve 402 and arrives at intersection point B2 of constant-torque curve 402 and voltage limiting circle 403, then the q-axis current command is limited by q-axis current limiter 110, and the current command vector moves along current limiting circle 403.

Figure 5:
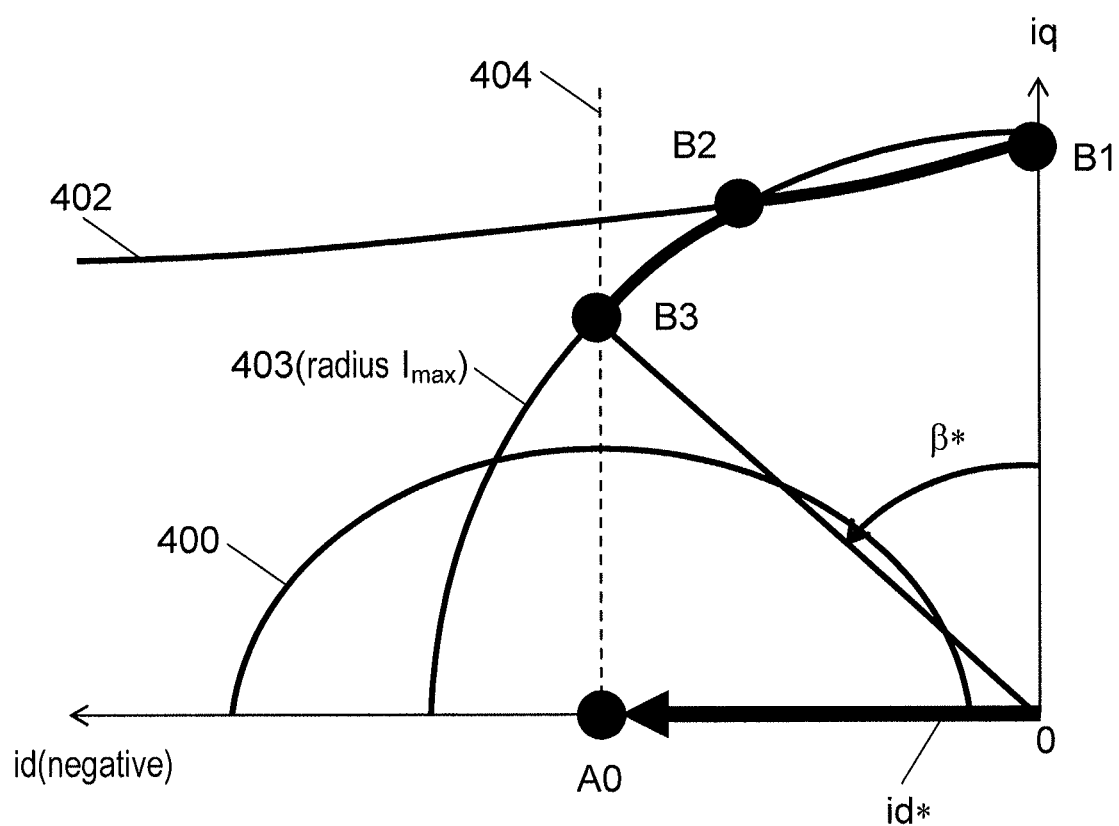
FIG. 5 illustrates a change in the locus of current-vector during the powering operation of the motor control device.

As shown in FIG. 5, after the current vector command arrives at intersection-point B3 of current limiting circle 403 and d-axis current limiting line 404, the d-axis current command is limited by d-axis current limiter 111. The current vector command thus moves along d-axis current limiting line 404.

Figure 6:
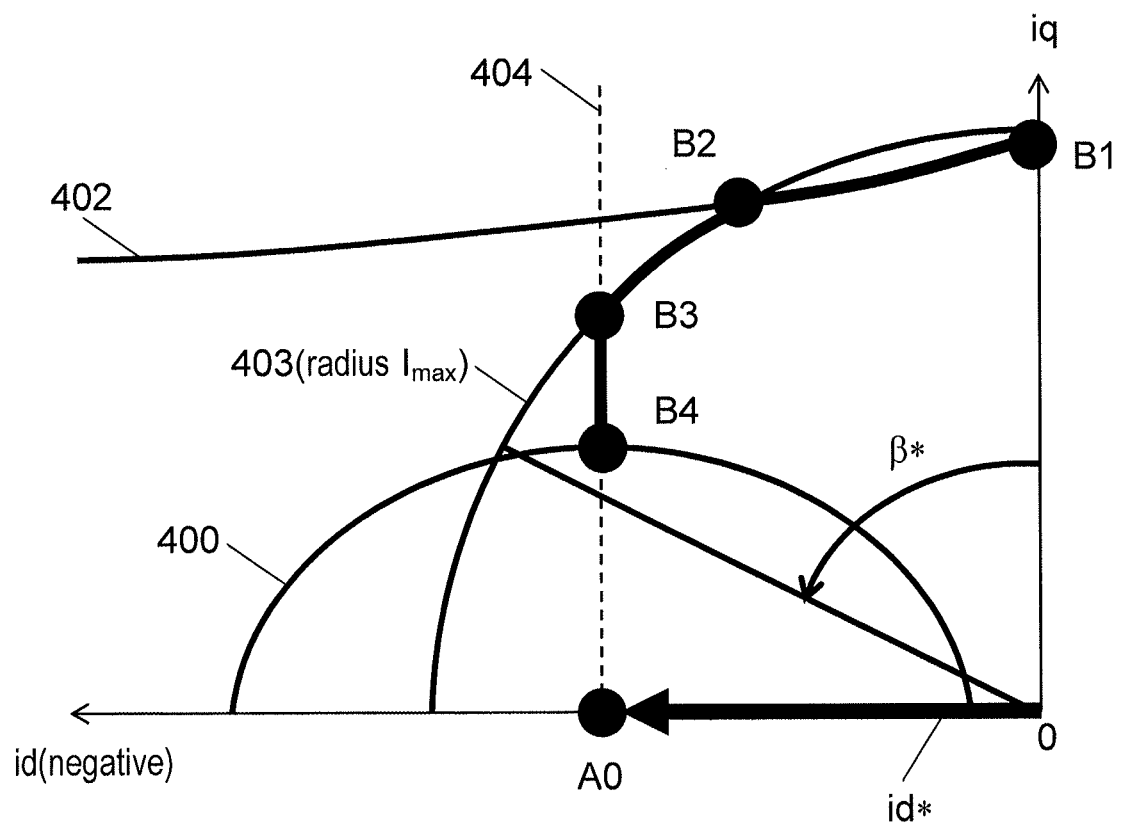
FIG. 6 illustrates a change in the locus of current-vector during the powering operation of the motor control device.

As shown in FIG. 6, when the current vector command arrives at intersection-point B4 of voltage limiting oval 400 and d-axis current limiting line 404, the voltage saturation is canceled.

Figure 7:
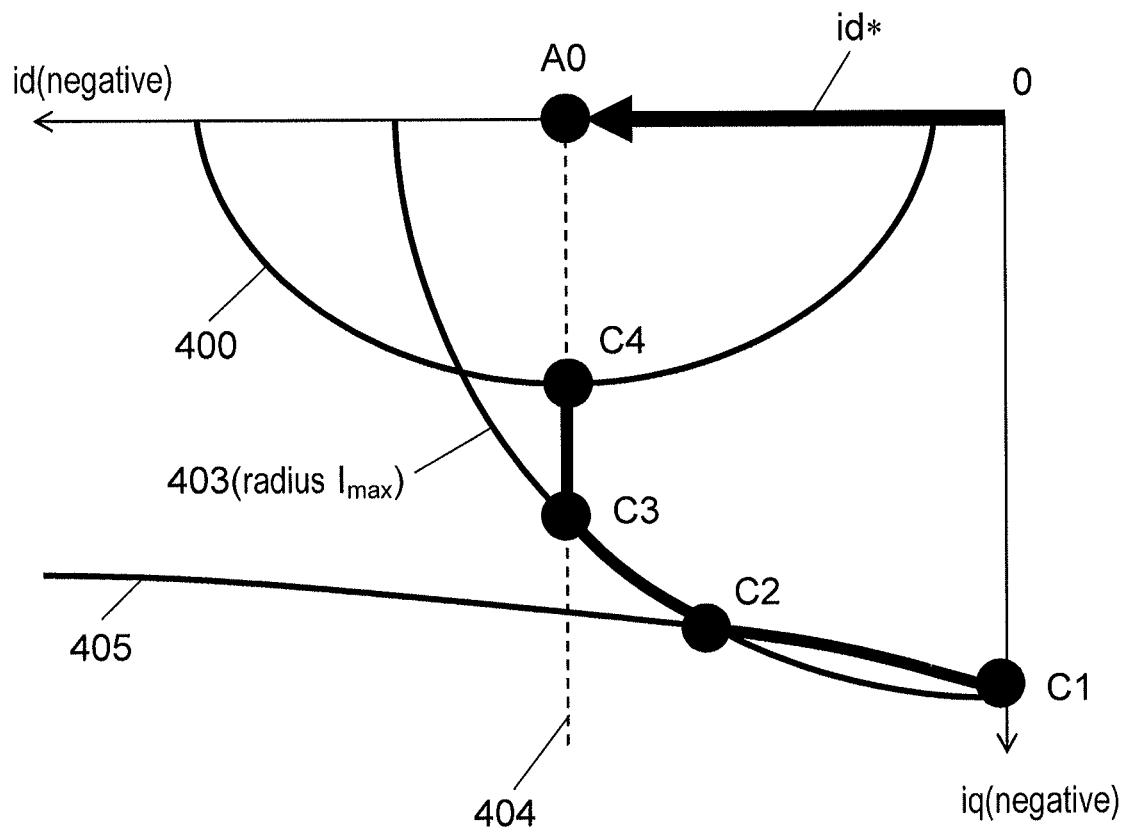
FIG. 7 illustrates a change in the locus of current-vector during the powering operation of the motor control device.

Next, a case where external torque value τ* is represented by curve 405 shown in FIG. 7 is demonstrated. In this case, namely, when a negative torque command is given, a regenerating operation (braking operation) that supplies a negative q-axis current to motor 100 is carried out. During the regenerating operation, when the voltage saturation occurs, the negative q-axis current exceeds the proper value, so that the flux weakening control is needed for preventing an induction voltage of motor 100 from increasing, and also preventing a braking effect and the current from increasing. However, in a limit region of the motor, namely when the external torque command value exceeds the limit torque of motor 100, the torque command value should be limited as it is done during the powering operation.

In the case shown in FIG. 7, the current vector value becomes point C1 when no negative d-axis current is supplied. Since point C1 is outside voltage limiting oval 400, motor 100 falls into the voltage saturation state, so that the flux weakening control is carried out and the q-axis current command is limited as those actions are taken in the foregoing powering operation.

As a result, the current command vector moves through point C1, C2, and C3 in this order, and when it arrives at intersection point C4 of d-axis current limiting line 404 and voltage limiting oval 400, the voltage saturation is canceled.

As discussed above, the motor control device in accordance with this first embodiment comprises the following structural elements:

phase-angle command generator 103 for generating phase-angle command β* based on difference Δv* between voltage-command absolute value |v*| supplied from current vector controller 102 to driver 101 and a given reference value $V_{lmt}$;

d-axis current command generator 109 for generating d-axis current command $id_0$* and outputting it based on a sine value of phase-angle command β*; and q-axis current limiter 110 for setting a limit value of the q-axis current command based on a cosine value of phase-angle command β*.

The foregoing structure allows d-axis current command $id_0$* to increase in the negative direction based on the voltage command absolute value |v*| exceeding the give reference value $V_{lmt}$, and allows the limit value of q-axis current command $iq_0$ to decrease. The flux weakening control and the limitation of q-axis current command $iq_0$* are carried out in response to the magnitude of the voltage saturation. As a result, when a torque command value exceeding the limit torque of motor 100 is input, q-axis current command iq* can be maintained automatically and accurately within the output limit of motor 100 even if the motor constant contains variation or dispersion. On top of that, during the regenerating operation, q-axis current command iq* can be also properly limited. The foregoing structure thus allows motor 100 to be driven stably with high output during the powering operation, and allows motor 100 to be driven stably with high efficiency avoiding over-current, over-voltage, and excessive braking torque during the regenerating operation.

The motor control device in accordance with this embodiment allows d-axis current command generator 109 to output a command of the d-axis current. This command is obtained this way: the d-axis current vector is combined with the q-axis current vector to produce a current vector, of which upper limit, namely max. current value $I_{max}$ is multiplied by the sine value of the phase-angle command, and a sign of the production of this multiplication is changed to an opposite one. This resultant value is output as the command of the d-axis current. Q-axis limiter 110 sets a limit value to a command of the q-axis current. This limit value is calculated this way: the cosine value of the phase-angle command is multiplied by max. current value $I_{max}$. The resultant product is set as the limit value.

The motor control device in such a simple structure as discussed above allows the electric current flowing in motor 100 to be limited to a value not greater than max. current value $I_{max}$, and the d-axis current to be limited to a value not greater than a given limit value. As a result, heat generation and lower efficiency caused by an excessive increase in the motor current can be prevented with ease. The excessive increase in the current of motor 100 is caused by an increment in the d-axis current.

The motor control device in accordance with this embodiment includes d-axis current limiter 111 that limits the command of d-axis current to a given limit value smaller than max. current value $I_{max}$. This structure allows further preventing the d-axis current from increasing around an output limit region, thereby advantageously preventing the copper loss from increasing.

This first embodiment allows setting the given limit value of the d-axis current at 0 (zero) in the d-axis current limiter, so that the d-axis current is always maintained at 0 (zero). Although the flux weakening control is not carried out in this case, the q-axis current command can be limited properly even if the motor constant includes variation or dispersion. As a result, a stable powering operation or regenerating operation can be expected in the voltage saturation region.

Exemplary Embodiment 2

Figure 8:
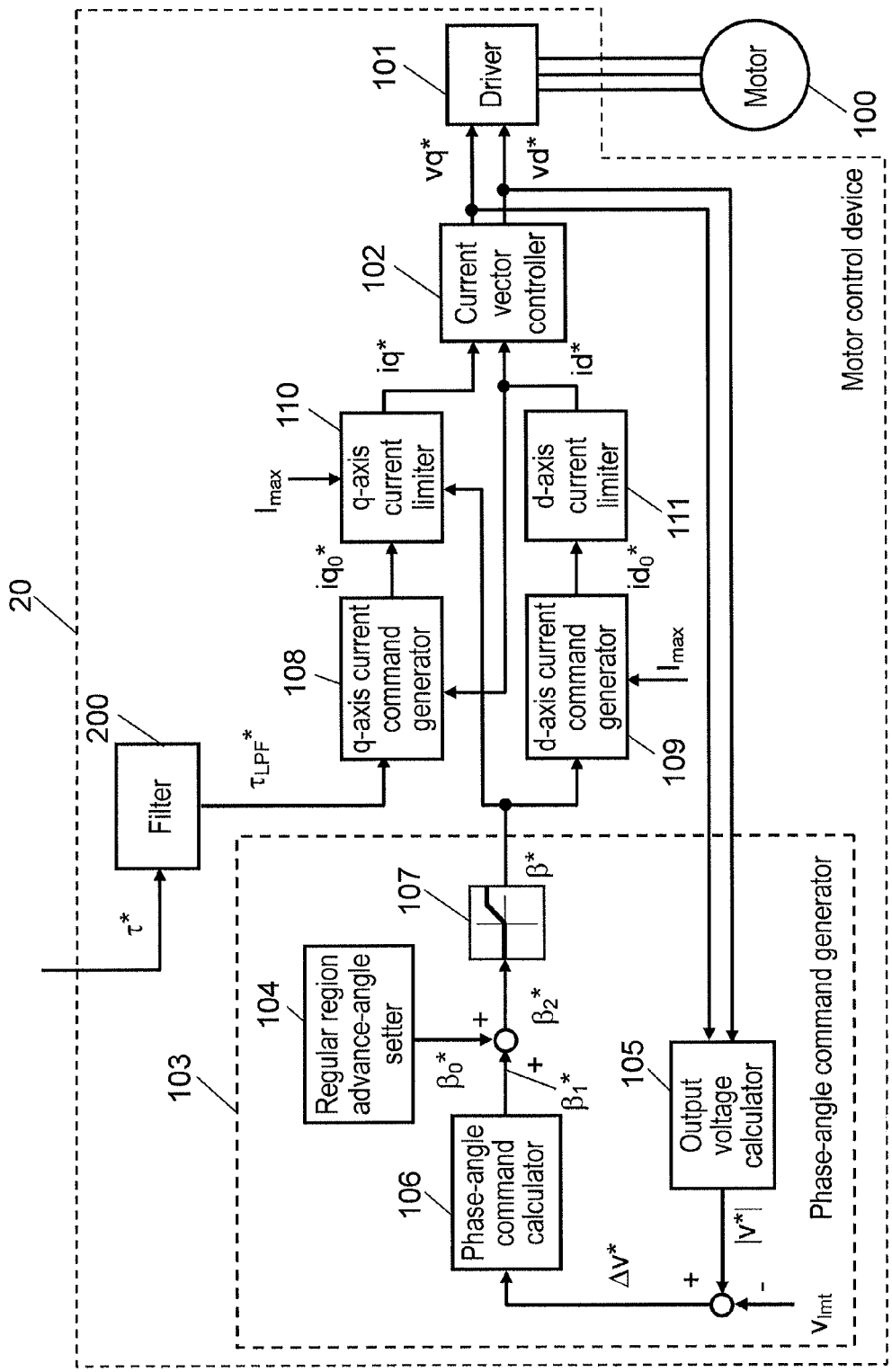
FIG. 8 is a block diagram of an electric motor control device in accordance with a second embodiment of the present invention.

FIG. 8 is a block diagram of motor control device 20 in accordance with the second embodiment of the present invention. The second embodiment employs filter 200 at a stage prior to q-axis current command generator 108 of the first embodiment shown in FIG. 1. The other structures remain the same as those of the first embodiment, so that the descriptions of the same structural elements are omitted here.

Filter 200 smoothes torque command τ* supplied from the outside as a target command value. A smoothing algorithm is not limited to a specific one. For instance, a first-order lag low-pass filter can be used. Smoothed torque command $\tau_{LPF}^*$ is input to q-axis current command generator 108.

Figure 9:
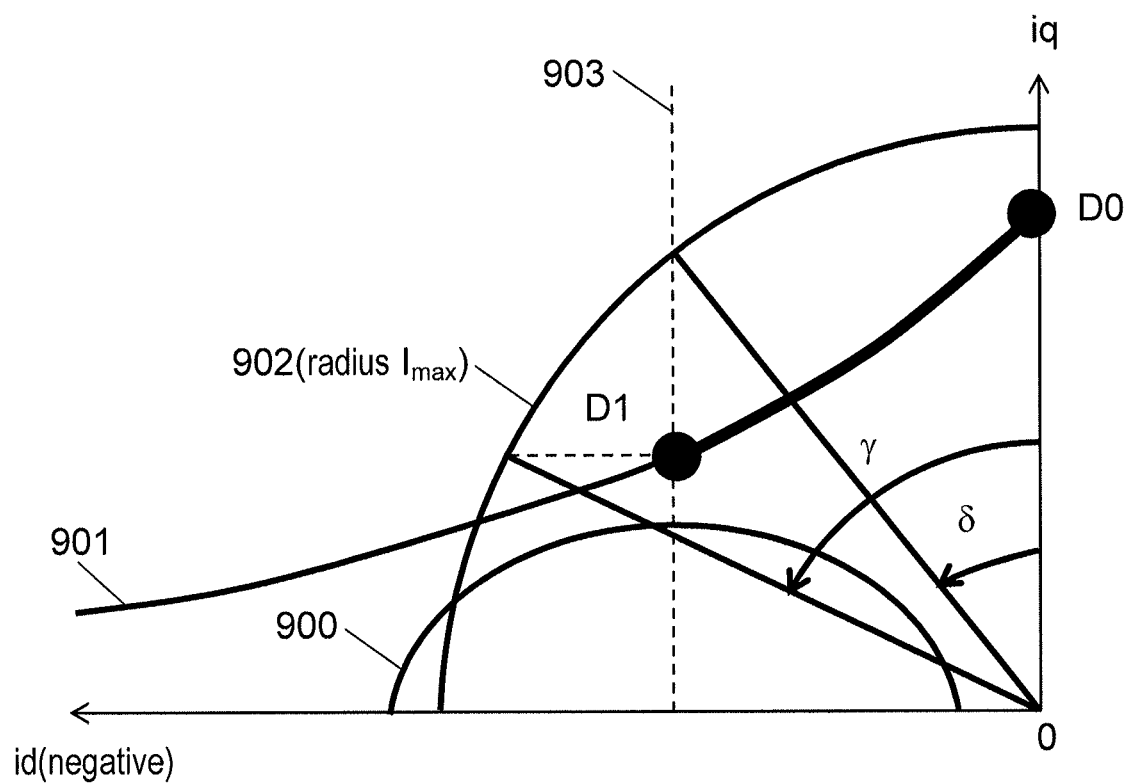
FIG. 9 illustrates a change in the locus of current-vector during the powering operation of the motor control device in accordance with the second embodiment.

The action and advantage of filter 200 is demonstrated hereinafter with reference to FIG. 9 that depicts a current vector locus. FIG. 9 shows voltage limiting oval 900, constant torque curve 901 that represents an external torque command, current limiting circle 902, and d-axis current limiting line 903.

The current command vector becomes point D0 in FIG. 9 when no negative d-axis current flows. Since point D0 is outside the voltage-limiting oval 900, motor 100 falls in the voltage saturation state. As a result, phase-angle command β* is generated, and negative d-axis current vector id* increases (flux weakening control). The point on constant torque curve 901 corresponding to the d-axis current vector id* becomes the current command vector.

When phase-angle command β* increases to δ shown in FIG. 9, the d-axis current vector reaches to d-axis current limiting line 903, and the current command vector becomes point D1. When phase-angle command β* exceeds γ shown in FIG. 9, q-axis current limit value $iq_{lmt}$ determined by equation (5) becomes smaller than the q-axis coordinate at point D1, thereby starting a limitation of the q-axis current command. During a period, at which phase-angle command β* changes from δ to γ, the current command vector is fixed at point D1. During this fix-period and the period at which the current command vector moves from point D0 to point D1, the torque is controlled based on constant torque curve 901 exceeding the limit torque of motor 100, so that an overshoot or undershoot possibly occur in the output torque.

Filter 200 moderates the fixed state of the current command vector and relaxes the changes of torque command $\tau_{LPF}^*$, thereby preventing the overshoot or undershoot in the output torque.

The previous discussion refers to an instance of smoothing the torque command τ*, however, q-axis current command $iq_0^*$ can be smoothed instead of what is discussed above. In this case, an advantage similar to the foregoing one can be expected.

As discussed above, this second embodiment proves that the structure including filter 200 allows advantageously preventing the overshoot or undershoot in the output torque in addition to the advantages obtained in the first embodiment.

Exemplary Embodiment 3

Figure 10:
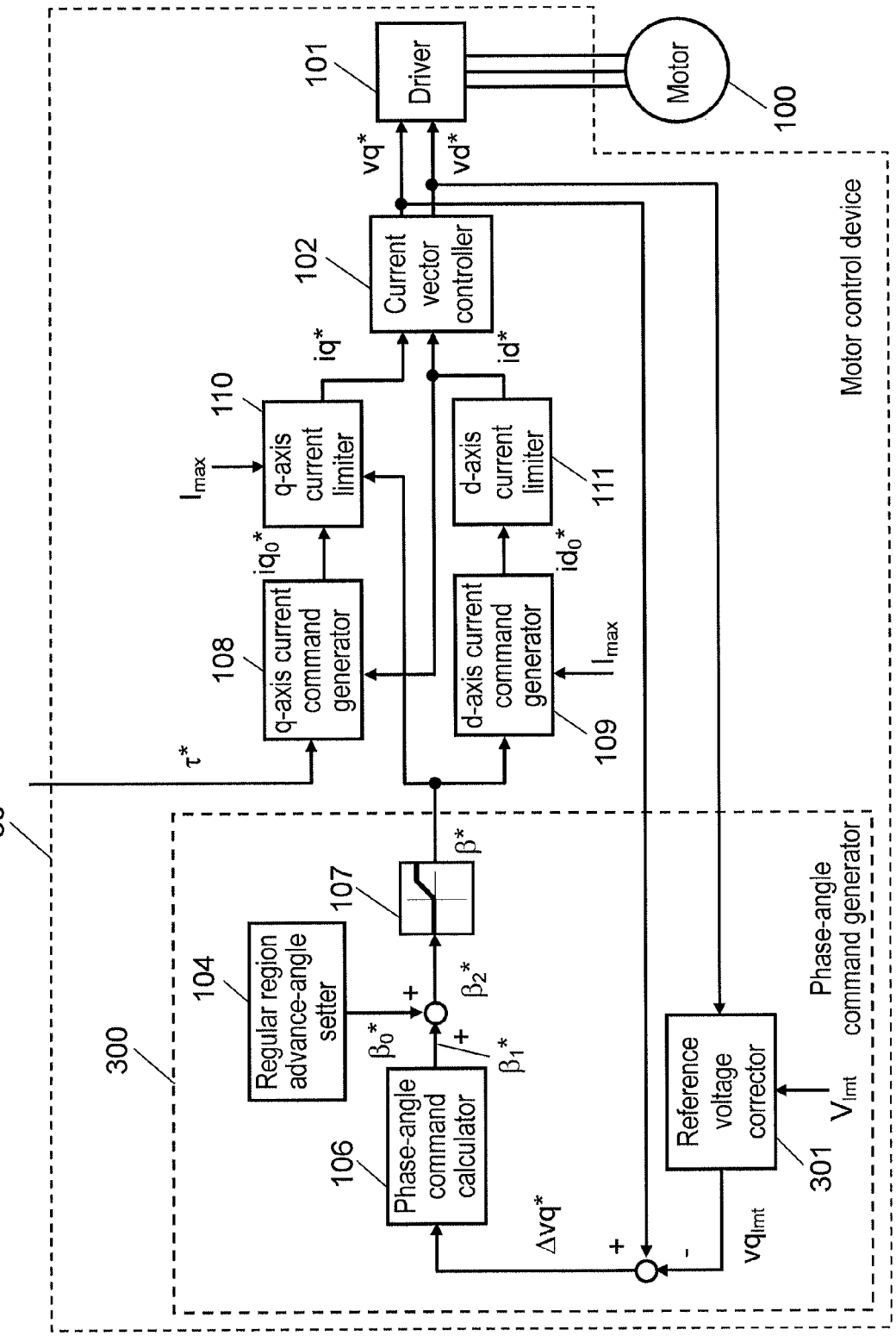
FIG. 10 is a block diagram of an electric motor control device in accordance with a third embodiment of the present invention.
Figure 11:
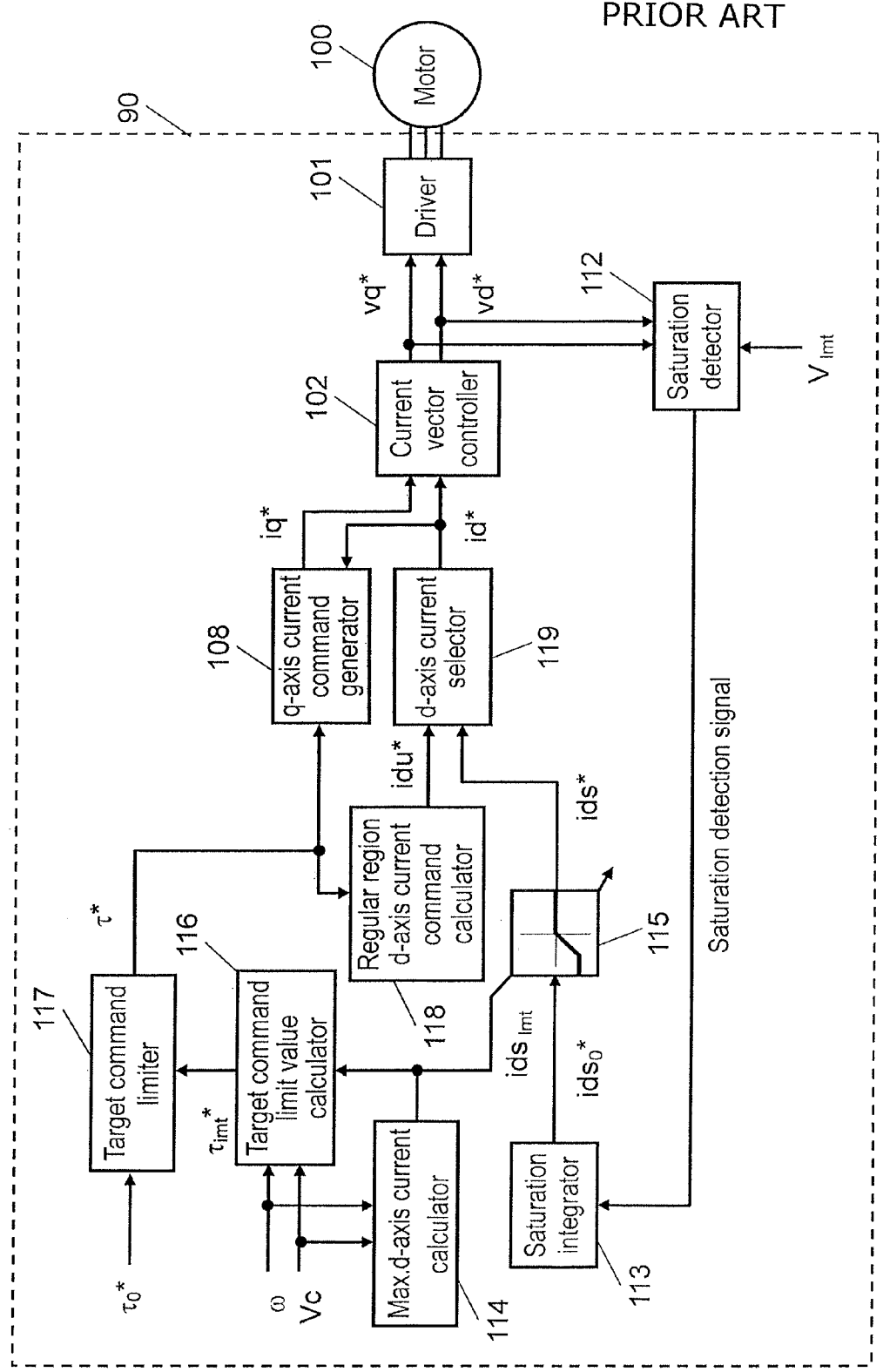
FIG. 11 is a block diagram of a conventional motor control device.

FIG. 10 is a block diagram of motor control device 30 in accordance with the third embodiment of the present invention. This third embodiment employs phase-angle command generator 300 shown in FIG. 10 instead of phase-angle command generator 103 shown FIG. 1 in accordance with the first embodiment. The other structures remain the same as that of the first embodiment, so that the detailed descriptions of the same elements are omitted here.

Phase-angle command generator 300 in FIG. 10 uses q-axis component vq* of a voltage command instead of absolute value |v*| of the voltage command used in the first embodiment. Reference voltage corrector 301 corrects the given reference value $V_{lmt}$ in the first embodiment based on equation (6) that uses d-axis component vd* of the voltage command. Difference Δvq* obtained by subtracting the corrected reference value $vq_{lmt}$ from d-axis component vq* is output to phase-angle command calculator 106.

$$vq_{lmt} = \sqrt{V_{lmt}^2 - vd^{*2}} \quad (6)$$

Equation (6) includes one input parameter vd* with respect to output parameter $vq_{lmt}$, so that equation (6) has less load to computation than equation (1) that includes two input parameters.

INDUSTRIAL APPLICABILITY

The motor control device of the present invention can drive a motor stably with high output free from influence of variation or dispersion in the motor constant. This motor control device thus can be used in a motor of permanent-magnet synchronous type, which motor is obliged to be driven in a voltage saturation region. This motor control device can be thus used for driving, a motor itself, a vehicle-mounted motor where a capacity of a battery is limited, or a motor for actuators or machine tools that need large torque instantaneously or intermittently.

The invention claimed is:

1. An electric motor control device equipped with a current vector controller that follows a target command value for controlling an electric current of a motor by separating the current into a d-axis current and a q-axis current orthogonal to each other, the electric motor control device comprising:
   a driver for driving the motor;
   a phase-angle command generator for generating a phase-angle command based on a difference between an absolute value of a voltage command supplied from the current vector controller to the driver and a given reference value;
   a d-axis current command generator for generating a command of the d-axis current based on a sine value of the phase-angle command; and
   a q-axis current limiter for setting a limit value of a command of the q-axis current based on a cosine value of the phase-angle command.

2. The electric motor control device of claim 1, wherein the d-axis current command generator outputs the command of the d-axis current, where the command takes a value found by combining a d-axis current vector and q-axis current vector together, and a upper limit value of the combined value, namely a maximum current value, is multiplied by the sine value of the phase-angle command, and then a sign of a product of the multiplication is changed to an opposite one, this resultant value is output as the command of the d-axis current,
   wherein the q-axis current limiter sets a limit value of the command of the q-axis current, where the limit value takes a value found by multiplying the cosine value of the phase-angle command by the maximum current value.

3. The electric motor control device of claim 2 further comprising a d-axis current limiter for limiting the command of the d-axis current to a given limit value smaller than the maximum current value.

4. The electric motor control device of claim 1 further comprising a filter for smoothing a target command value supplied from outside or the command of the q-axis current.

5. The electric motor control device of claim 1, wherein the phase-angle command generator generates the phase-angle command using a q-axis component of the voltage command instead of using the absolute value of the voltage command supplied to the driver.

6. The electric motor control device of claim 5, wherein the given reference value of the phase-angle command generator is corrected by using a d-axis component of the voltage command supplied to the driver.

7. The electric motor control device of claim 3, wherein the d-axis current limiter sets the given limit value at 0 (zero).

8. The electric motor control device of claim 4, wherein the d-axis current limiter sets the given limit value at 0 (zero).

9. The electric motor control device of claim 5, wherein the d-axis current limiter sets the given limit value at 0 (zero).

10. The electric motor control device of claim 6, wherein the d-axis current limiter sets the given limit value at 0 (zero).

* * * * *